United States Patent [19]

Gross

[11] Patent Number: 5,343,937
[45] Date of Patent: Sep. 6, 1994

[54] THERMAL CONTROL OF CONCENTRIC TUBE LIQUID SOURCE GAS LINES

[75] Inventor: Timothy D. Gross, Boise, Id.

[73] Assignee: Micron Technology, Inc., Boise, Id.

[21] Appl. No.: 856,816

[22] Filed: Mar. 24, 1992

Related U.S. Application Data

[63] Continuation of Ser. No. 342,112, Apr. 24, 1989, abandoned.

[51] Int. Cl.$^5$ ............................................. F16L 53/00
[52] U.S. Cl. ...................................... 165/70; 165/11.1; 137/334; 137/340
[58] Field of Search ............... 137/334, 340; 165/70, 165/11.1

[56] References Cited

U.S. PATENT DOCUMENTS

| | | | |
|---|---|---|---|
| 1,528,822 | 3/1925 | Gilchrist | 137/340 |
| 1,960,866 | 5/1934 | Chadwick | 137/340 |
| 4,090,554 | 5/1978 | Dickinson | 165/70 |

FOREIGN PATENT DOCUMENTS

| | | | |
|---|---|---|---|
| 22898 | 2/1983 | Japan | 165/11.1 |

Primary Examiner—Albert W. Davis, Jr.
Attorney, Agent, or Firm—Stanely N. Protigal

[57] ABSTRACT

A double containment liquid source gas line uses an outer annular chamber which functions as a safety containment housing and a thermal control liner. The thermal control is accomplished by providing hot water and pumping the water in a closed loop configuration. The water serves to accurately and reliably control temperature of liquid source gas in the gas line. The water is in a closed loop system, so that, by providing leak detection equipment on the water line, faults in either chamber may be rapidly detected.

17 Claims, 2 Drawing Sheets

THERMAL CONTROL OF CONCENTRIC TUBE LIQUID SOURCE GAS LINES

This application is a continuation of application Ser. No. 342,112 filed Apr. 24, 1989 now abandoned.

BACKGROUND OF THE INVENTION

1. Field of the Invention

The present invention relates to fluid handling using concentric tubes. More specifically, the invention relates to using heated water to insulate and heat a liquid source gas line to prevent the gas vapor from condensating in the gas line downstream of the source.

2. Description of the Related Art

In the fabrication of LSI and VLSI semiconductor devices, many of the etch steps required have to be done with a dry etch process. Most metal etch and many poly etch processes require the use of a chlorine based chemistry. To optimize the process, there are several gasses that are used which are called liquid source gases. This means that at atmospheric pressure, the gas is in a liquid state. When the liquid is put in a container, and a vacuum source is applied, the vacuum will pull the vapor or gas off the top of the liquid. When a sufficient reduction in pressure is obtained, there will be enough gas in the line to supply the etch reactor.

The problem with this system is that as the gas vapor gets further away from the liquid source, it becomes more vulnerable to a temperature condensation effect. In other words, the gas turns back into a liquid in the gas line. This in turn blocks the gas line and restricts any gas from arriving at the etch reactor.

The key in preventing this from happening is to keep the bottle or tank which contains the liquid gas source cooler than any other point in the gas distribution system. The conventional way to do this involves two different methods. The first method involves placing a coolant jacket around the liquid source container. The temperature is controlled by a chiller. This would result in being able to keep the liquid cooler than any other point in the gas distribution system.

The other method of controlling the temperature of the gas delivery system involves keeping the gas lines from the outlet of the liquid source container to the rest of the gas distribution system warmer than the liquid source container. This is conventionally done by either insulating the gas lines to keep cool air from blowing on them or by wrapping the lines with an electrical heater line. The temperature of this line is controlled by either a transformer, or just plugged into a wall socket. Both the heater line and the insulator can be used together to ensure that the gas lines stay warmer than the liquid source.

There are several problems associated with using a heater line. First, the length of heater line needed can be excessive since the best way to insure that the gas line is heated properly is to wrap the heater line around the gas line evenly. Not only is the line lengthy, it is also rather unsightly. The second problem with using a heater line is that the line becomes brittle after a period of time. This could result in an open electrical line. Also, it is sometimes hard to keep the temperature from getting too high. If insulation is used around the heater line, sometimes the high temperature will melt the insulation.

New federal regulations require that double containment gas lines be used for all corrosive gasses. This applies only to new fab construction and remodeling. These gas lines have an inner and outer shell. The inner shell is where the gas flows. The outer shell is just a safety backup in case the inner shell develops a leak.

Babcock & Wilcox' U.S. Pat. No. 3,098,023, to Schluderberg, describes a nuclear reactor primary coolant containment system in which pipe sections have annular shells. The shells are used to pressure test the system. They also provide a fluid containment feature so that a loss of coolant accident is unlikely to occur unless someone shuts off the wrong valve. The concentric annular pipe is used for redundancy and for a pressure test function.

The Boise Warm Springs Water District municipal hot springs system uses concentric pipes for all new underground supply connections. The inner pipe is iron, which is passivated from corrosion by the chemical balance of the water. Previous single walled pipes were iron, and these did not corrode from the inside. The outside of the single walled pipes were subject to corrosion, which resulted from electrolytic action in the soil, accelerated by the heat from the hot springs water. Coated pipe was ineffective because a failure in the integrity of the coating would result in accelerated corrosion at the breach. The Warm Springs District chose a concentric pipe construction, with insulation between inner and outer pipes. This permits a corrosion resistant outer pipe to resist soil induced corrosion, while the inner pipe is protected from the soil chemistry. Insulation is used between the pipes to reduce heat loss from the system between the user and the wells.

SUMMARY OF THE INVENTION

An object of the present invention is to provide a method of heating a liquid source gas line that is different from the conventional heating method. Another object of the present invention is to have an alarm system which will warn the operator or maintenance personnel if either the temperature or water flow deviates from the set point. Still another object of the present invention is to improve the reliability of the etch process, and the production and device yield.

These and other objects of the present invention are attained by providing a method of heating the gas distribution system wherein heated water circulates through an outer shell or annular chamber of the double containment gas line.

To heat the water, a chiller/heater such as a Neslab is used to maintain the temperature at 50° C. The supply and return water lines between the heater and a gas distribution system are connected to the outer shell of the double containment gas line via a quick disconnect system or a standard hose clamp system.

The output side of the heater is the supply line and is connected to the gas line as close to the etch reactor as possible. The return water line exits the gas line as close to the liquid source container as possible. This method means that the hottest water is kept close to the reactor. The water temperature decreases slightly as it flows through the outer shell of the gas distribution system. This is the best situation since the liquid source container is then the coldest part of the gas distribution system and the point which is furthest away from the liquid source is the warmest part of the gas line.

The invention is intended for use with a liquid source gas. A liquid source gas is a material which is a liquid under standard temperature and pressure (ambient conditions), but, when heated or placed under a vacuum, becomes gaseous. A liquid source gas is stored in liquid form and is delivered to a semiconductor processing reactor in a gaseous state. Therefore, the material is a fluid at all times during the process.

In the process of delivering liquid source gas, the material is usually transferred as a fluid in a gaseous state in gas lines.

DETAILED DESCRIPTION OF THE PREFERRED EMBODIMENT

Figure 1:
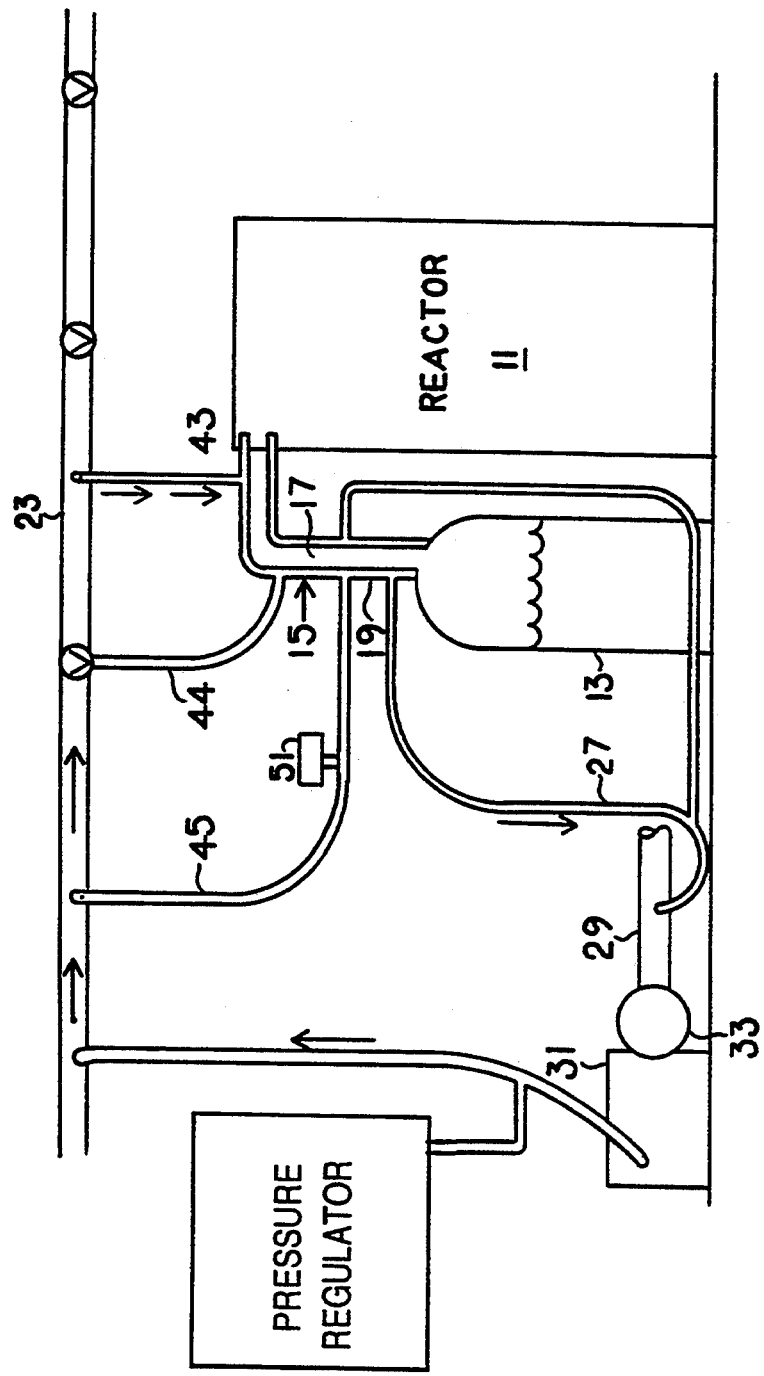
FIG. 1 is a schematic view of closed loop water supply system.

A reactor 11 using liquid source gas is schematically shown in FIG. 1. The liquid source gas is supplied to the reactor 11 from a liquid source supply container 13. A double-containment gas line 15 is used to supply to gas from the container 13 to the reactor 11. The gas is then transported through an inner annular chamber 17, and outer annular chamber 19 providing safety containment, should the inner chamber 11 develop a leak.

In order to maintain the gas in a gaseous state, the gas line 15 is heated. Therefore, even if the gas in the gas line 15 approaches the pressure of the container 13, the gas does not condense prior to reaching the reactor 11.

Figure 2:
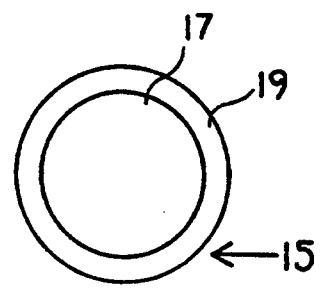
FIG. 2 is a schematic cross-sectional view of the double containment gas line.
Figure 3:
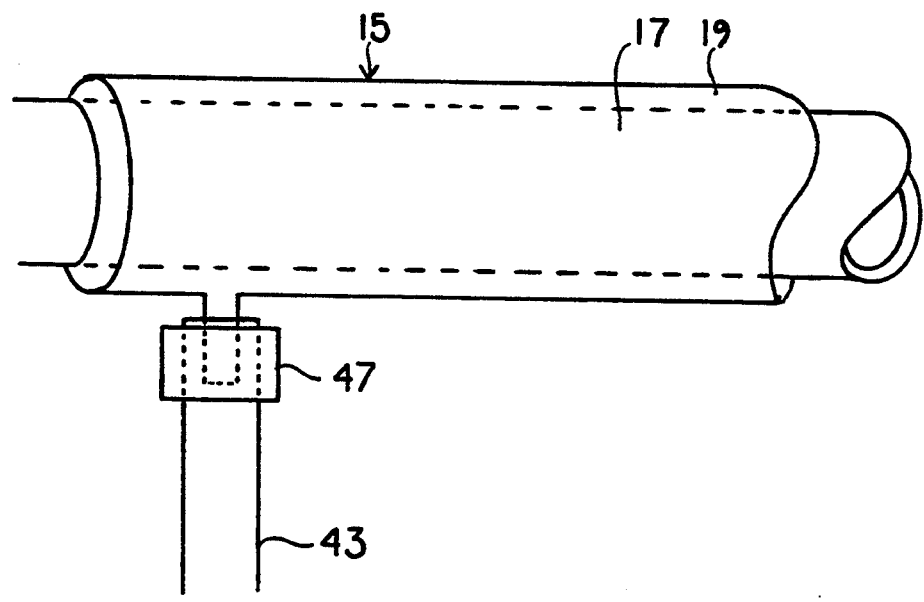
FIG. 3 is a schematic view of how the water line is connected to the outer shell of the double containment gas line.

FIGS. 2 and 3 show the configuration of the double-containment gas line 15. In the configuration used in this invention, a heated fluid such as water is pumped through the outer annular chamber 19, thereby preventing heat loss from the inner annular chamber 17 below the temperature of the water in the outer annular chamber 19 for an equilibrated gas in the inner annular chamber 17. While there are cases in which the gas in the inner annular chamber 17 may have a vapor pressure which is less than that of the gas in the chamber 17, the heated outer annular will limit the ability of the gas to condense. The requirement to heat the gas line 15 becomes more significant near the reactor 11 than near the container 13. This is for two reasons. The first is that if condensation takes place near the container 13, the condensed fluid may still be heated to a gaseous state near the reactor 11. The second, the fluid is discharged from the container 15 in a gaseous state, the gas has more time to condense by the time it approaches the reactor 11. In that case, it is important that the fluid enter the reactor 11 in a gaseous state.

It is also noted, that along significant lengths of gas line, it is possible for cooling to take effect. On the other hand, it is important to control the temperature of the gas as the gases are supplied to the reactor 11.

Referring again to FIG. 1, a supply manifold 23 is used to supply the heated water to the outer annular chamber 19 by a line 43 at a location close to the reactor 11. A return connection 27 receives water from the outer annular chamber 19 and feeds the water to a return manifold 27. the water is pumped through a heater 31 in a closed loop back to the supply manifold 23 by a pump 33.

The water from the supply manifold 23 is provided at an optimum temperature, as will be described. This temperature is now set at 50° C., but is expected to range from 30°0 to 60° C. In the particular application being used, temperatures in excess of 60° C. would be unnecessary and could be dangerous.

The optimum temperature of the water is the temperature for establishing the temperature of the liquid source gas at the desired temperature for supply to the reactor. This temperature may also be higher to compensate for heat loss along the double containment line. Heat loss along the double containment line is critical because condensation of the liquid source gas may adversely affect flow of the fluid through the line. It is possible to provide the water at plural sources 43, 44, 45 if thermal losses along the line 15 exceed the desired temperature range of the gas in the line 15.

The double containment gas line 15 is able to be used to detect leaks in the inner chamber 17. Fluid pressure in the outer chamber is provided with a pressure controller which is adjustable in order to control pressure. The pressure controller is able to establish a water pressure in the outer chamber which can be measured. A detector 51 is used to sense such leaks. The detector 51 is placed in communication with the outer annular chamber 19. This may be for example, at a remote location on the system, as shown. The detector may be a gas detector or a pressure sensor. Therefore, the system may be tested by pressure testing the outer annular chamber 19. Since the system is a closed loop system, rapid changes in pressure sensed by the detector may be used to sense a leak condition. It is possible to provide both a gas detector and a pressure sensor.

EXAMPLE

A water heater is connected to a main trunk line via a water hose. This hose carries the supply water to a connection to the outer annular chamber of a double containment gas line. Various connection points are provided, which can be valved on or off at the trunk line. At the point where hot water is needed, another water hose is connected between the main trunk line and to the double containment gas line as close to the etch reactor as possible. Near the liquid source container, the return supply water hose is connected between the gas line and the heater unit. This configuration is a closed loop hot water system, similar to that represented in FIG. 1.

The gas used in the inner chamber is silicon tetrachloride ($SiCl_4$). Other gasses would be $BCl_3$ or carbon tetrachloride.

The water is maintained at a 50° C. temperature, which keeps the gas from condensing into a liquid after it leaves the liquid source container.

The present invention is not restricted to the above-mentioned description and that many variations are possible for persons skilled in the art without departing from the scope of the invention.

I claim:

1. Fluid transfer line having fluid supply and fluid discharge connections for a working fluid, and providing safety containment of a working fluid which is discharged from the line in a gaseous state, characterized by:

a) concentric inner and outer chambers, configured such that, if the inner chamber develops a breach in its integrity, the inner chamber leaks to the outer chamber or the outer chamber leaks to the inner chamber, depending on the relative pressures of the inner and outer chambers, and the outer chamber contains any fluid which may leak from the inner chamber;

b) working fluid supply and discharge connections communicating with the inner concentric chamber;

c) the working fluid and discharge connections and the inner concentric chamber configured so as to establish working fluid flow in a downstream direction;

d) the inner concentric chamber not communicating with the outer concentric chamber during a normal mode of operation;

e) thermal control fluid inlet and outlet connections on the outer concentric chamber, said inlet being located at a location on the outer concentric chamber downstream of the outlet connection, thereby permitting a thermal control fluid to flow in the outer concentric chamber from the inlet connection to the outlet connection in an upstream direction with respect to the working fluid, the thermal control fluid comprising hot water and the outer chamber being used to flow the hot water around the inner chamber;

f) a pump for causing the thermal control fluid to flow in said upstream direction;

g) temperature maintenance means for bringing the thermal control fluid to a temperature which will maintain the thermal control fluid at a predetermined temperature when it reaches the thermal control fluid inlet connection, the temperature maintenance means being a water heater;

h) means to detect a breach in the integrity of the inner chamber, including means for detecting presence of the working fluid within the outer concentric chamber, whereby the detection of the working fluid within the outer concentric chamber is used as indicator of failure and i) said working fluid, the working fluid being a liquid source gas.

2. Fluid transfer line as described in claim 1, further characterized by:

said means for detecting presence of the working fluid within the outer concentric chamber including a leak detector for detecting a leak between the chamber.

3. Fluid transfer line as described in claim 2, further characterized by:

the leak detector being a pressure sensor attached to the outer chamber.

4. Fluid transfer line as described in claim 2, further characterized by:

the leak detector being a gas detector attached to the outer chamber.

5. Fluid transfer line as described in claim 3, further characterized by:

pressure adjustment means for controlling pressure in the outer chamber in order to effect a leak check of the chambers.

6. Fluid transfer line as described in claim 5, further characterized by:

the pressure adjustment means establishing a water pressure and the leak detector including means to measure rate of change of the water pressure in order to detect a failure in the integrity of the inner and outer chambers.

7. Fluid transfer line as described in claim 5, further characterized by:

an alarm responsive to the leak detector.

8. Fluid transfer line as described in claim 1, further characterized by:

the inner and outer chambers comprising a double containment gas line, wherein the outer chamber is used to flow the thermal control fluid around the inner chamber.

9. Fluid transfer line as described in claim 1, further characterized by:

the thermal control fluid maintaining the working fluid at a temperature of between $-15°$ C. and $100°$ C.

10. Fluid transfer line as described in claim 9, further characterized by:

the thermal control fluid maintaining the working fluid at a temperature of between $30°$ and $60°$ C.

11. Fluid transfer line as described in claim 1, further characterized by:

a closed loop system comprising the second chamber, the pump and temperature maintenance means, the closed loop system providing a supply of thermal control fluid at a substantially constant temperature.

12. Fluid transfer line as described in claim 1, further characterized by:

a) said means to detect presence of the working fluid within the outer concentric chamber including a gas detector attached to the outer chamber; and b) an alarm responsive to the means to detect the presence of the working fluid.

13. Liquid source gas line having working fluid supply and fluid discharge connections, and providing safety containment of a working fluid which is discharged from the line in a gaseous state, characterized by:

a) said working fluid;

b) a first chamber for transferring said working fluid, wherein the working fluid is a liquid source gas;

c) a second chamber for a heating fluid;

d) working fluid supply and discharge connections communicating with the first chamber;

e) the working fluid supply and discharge connections and the first chamber configured so as to establish working fluid flow in a downstream direction;

f) the first and second chambers being configured such that, if the first chamber develops a breach in its integrity, the first chamber leaks to the second chamber or the second chamber leaks to the first chamber, depending on the relative pressures of the first and second chambers, and the second chamber contains any fluid which may leak from the first chamber;

g) the first chamber in a heat transfer relationship with the second chamber, but otherwise not communicating with the second chamber during a normal mode of operation;

h) heating fluid inlet and outlet connections on the second chamber, said inlet being located at a location on the second chamber downstream of the outlet connection, thereby permitting a heating fluid to flow in the second chamber from the inlet connection to the outlet connection in an upstream direction with respect to the working fluid;

i) a pump for causing the heating fluid to flow in said upstream direction;

j) a heater for heating the heating fluid to a temperature sufficient to maintain the heating fluid at a predetermined temperature when it reaches the heating fluid inlet connection; and k) means to detect a breach in the integrity of the inner chamber, including means for detecting presence of the working fluid within the outer concentric chamber, whereby the detection of the working fluid within the outer concentric chamber is used as indicator of failure, wherein a closed loop system is comprised of the second chamber, the pump and the heater, the closed loop system providing a supply of heating fluid at a substantially constant temperature.

14. Liquid source gas line as described in claim 13, further characterized by:

a) the heating fluid comprising hot water, and the temperature maintenance means being a water heater;

b) the second chamber being used to flow the hot water around the first chamber.

15. Liquid source gas line as described in claim 13, further characterized by:

the first and second chambers comprising a double containment gas line, wherein the second chamber used to flow the heating fluid around the first chamber.

16. Liquid source gas line as described in claim 13, further characterized by:

the heating fluid maintaining the working fluid at a temperature of between $-15°$ C. and $100°$ C.

17. Liquid source gas line as described in claim 13, further characterized by:

the heating fluid maintaining the working fluid at a temperature of between $30°$ and $60°$ C.

* * * * *